United States Patent
Jeong et al.

(10) Patent No.: US 7,551,568 B2
(45) Date of Patent: Jun. 23, 2009

(54) POWER MODE AWARE PACKET COMMUNICATION METHOD AND APPARATUS

(75) Inventors: Moo Ryong Jeong, San Jose, CA (US); Toshiro Kawahara, Saratoga, CA (US)

(73) Assignee: NTT Docomo Inc., Tokyo (JP)

( * ) Notice: Subject to any disclaimer, the term of this patent is extended or adjusted under 35 U.S.C. 154(b) by 629 days.

(21) Appl. No.: 11/159,852

(22) Filed: Jun. 22, 2005

(65) Prior Publication Data
US 2006/0002383 A1    Jan. 5, 2006

Related U.S. Application Data

(60) Provisional application No. 60/581,683, filed on Jun. 22, 2004, provisional application No. 60/601,411, filed on Aug. 13, 2004, provisional application No. 60/605,044, filed on Aug. 27, 2004.

(51) Int. Cl.
H04L 12/56     (2006.01)
H04W 4/00     (2006.01)
H04W 24/00   (2006.01)

(52) U.S. Cl. ............... 370/252; 370/311; 370/395.21; 455/432.3; 455/456.4

(58) Field of Classification Search ............. 370/401, 370/329–344, 318, 310, 311, 562
See application file for complete search history.

(56) References Cited

U.S. PATENT DOCUMENTS

| | | | | |
|---|---|---|---|---|
| 5,889,770 | A * | 3/1999 | Jokiaho et al. | 370/337 |
| 6,631,122 | B1 * | 10/2003 | Arunachalam et al. | 370/332 |
| 7,133,372 | B2 * | 11/2006 | Glendining et al. | 370/311 |
| 7,269,145 | B2 * | 9/2007 | Koo et al. | 370/311 |
| 7,324,468 | B2 * | 1/2008 | Fischer | 370/311 |
| 7,433,670 | B2 * | 10/2008 | Benveniste | 455/343.2 |
| 7,457,973 | B2 * | 11/2008 | Liu | 713/310 |
| 2002/0093955 | A1 | 7/2002 | Grand et al. | |
| 2003/0117968 | A1 | 6/2003 | Motegi et al. | |
| 2005/0213534 | A1 * | 9/2005 | Benveniste | 370/328 |

OTHER PUBLICATIONS

IEEE 802 Part 11: Wireless LAN Medium Access Control (MAC) and Physical Layer (PHY) Specifications. *IEEE Standard 802.11*, 1999.
IEEE Std 802.16a-2001: Part 16: Air Interface for Fixed Broadband Wireless Access Systems, 2001.
IEEE Std 802.16a-2003: Part 16: Air Interface for Fixed Broadband Wireless Access Systems—Amendment 2: Medium Access Control Modifications and Additional Physical Layer Specifications for 2-11 GHz. 2003.

* cited by examiner

*Primary Examiner*—Gregory B Sefcheck
(74) *Attorney, Agent, or Firm*—Haynes and Boone, LLP

(57) ABSTRACT

Packet communication method and system in which a packet destined for a terminal is provided service according to a service table indexed by packet classification and the terminal's power mode. The service table may specify for a connection a predetermined quality of service or discarding the packet. For a power mode having an alerting (i.e., paging) mechanism, the service may include alerting the terminal. The service table may also include a network edge point's own service requests and service requests from terminals, provisioning servers, and handoff sources. For a multicast or broadcast packet, as each terminal may be in a different power mode, the associated service in the service table may therefore be different for each terminal. In that case, the packet is provided with service so that any given terminal is provided with at least the quality of service specified in the service table. Thus, a multicast or broadcast packet is discarded when the service specified for all terminals is "discard." Each terminal is alerted, however, if the associated service includes alerting the terminal. During handoff, a part of service table associated with the terminal can be transferred from the handoff source to the handoff destination.

67 Claims, 5 Drawing Sheets

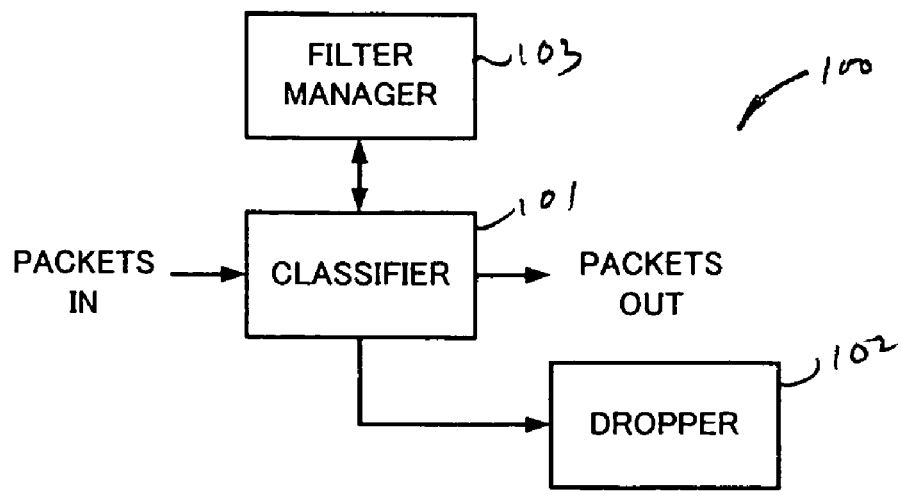
FIG. 1 Network firewall (prior art)
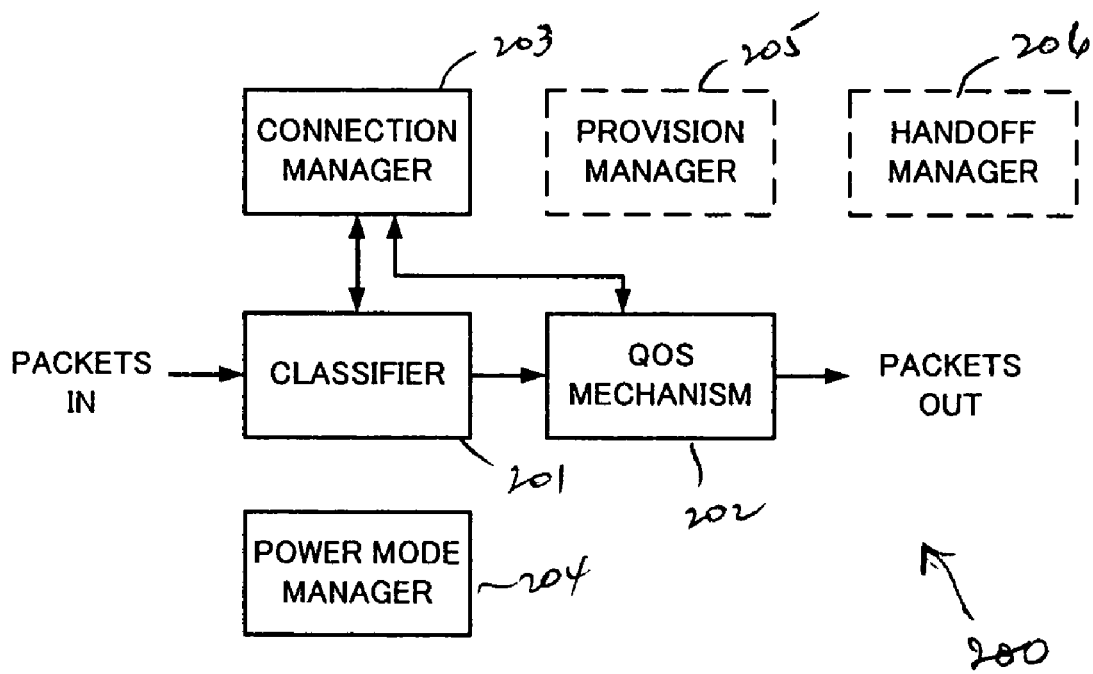
FIG. 2 Base station (prior art)

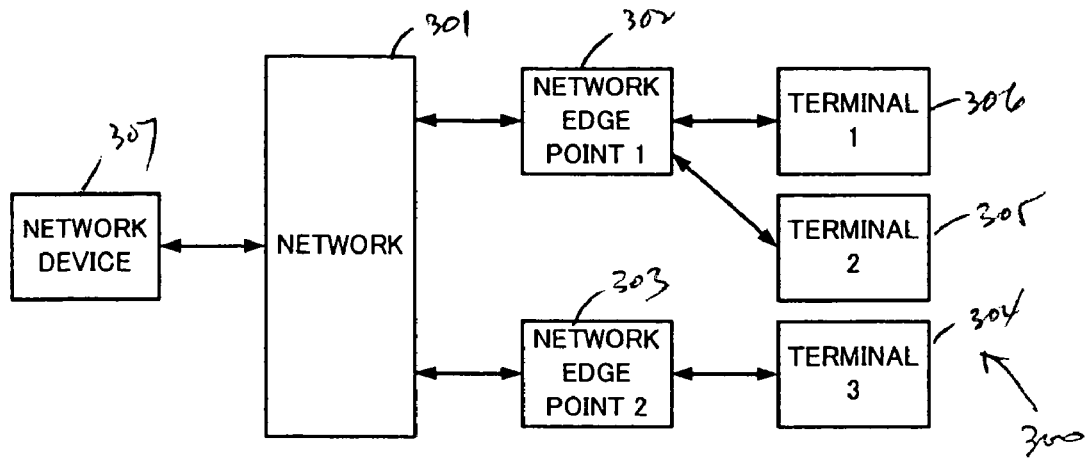
FIG. 3 Network configuration
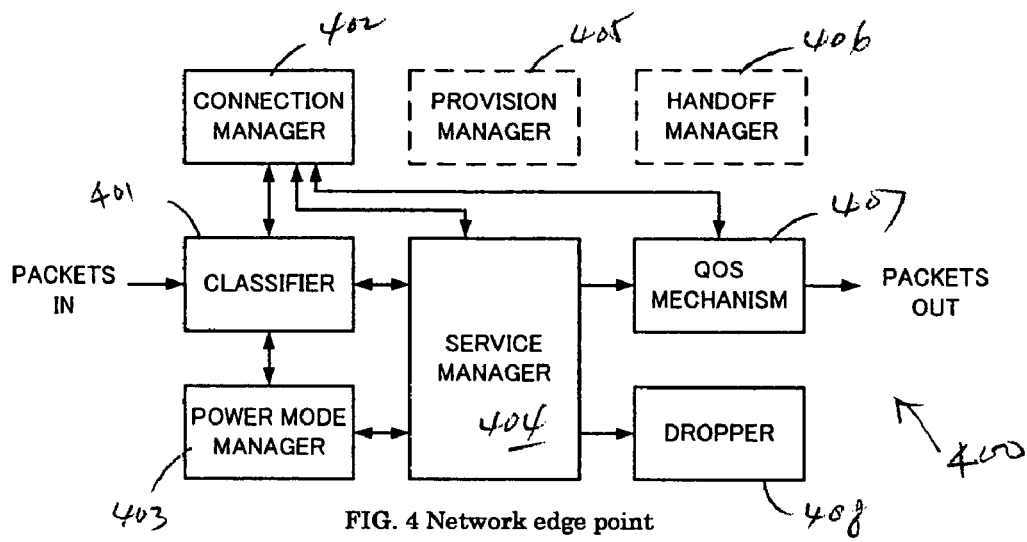
FIG. 4 Network edge point
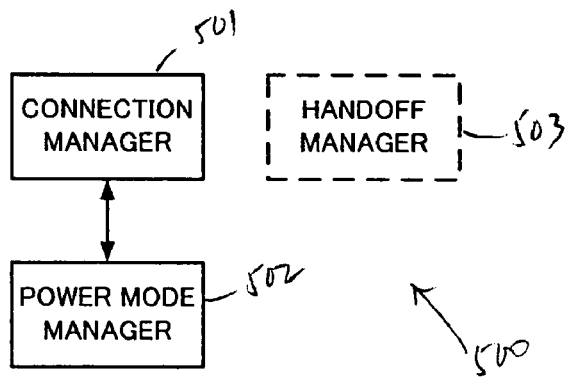
FIG. 5 Terminal

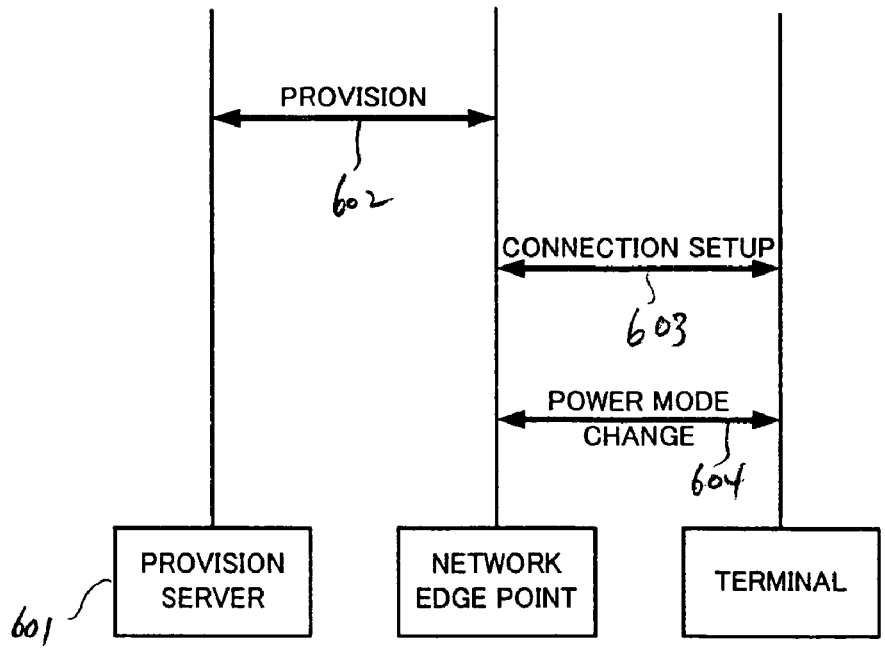
FIG. 6 Service table setup and activation
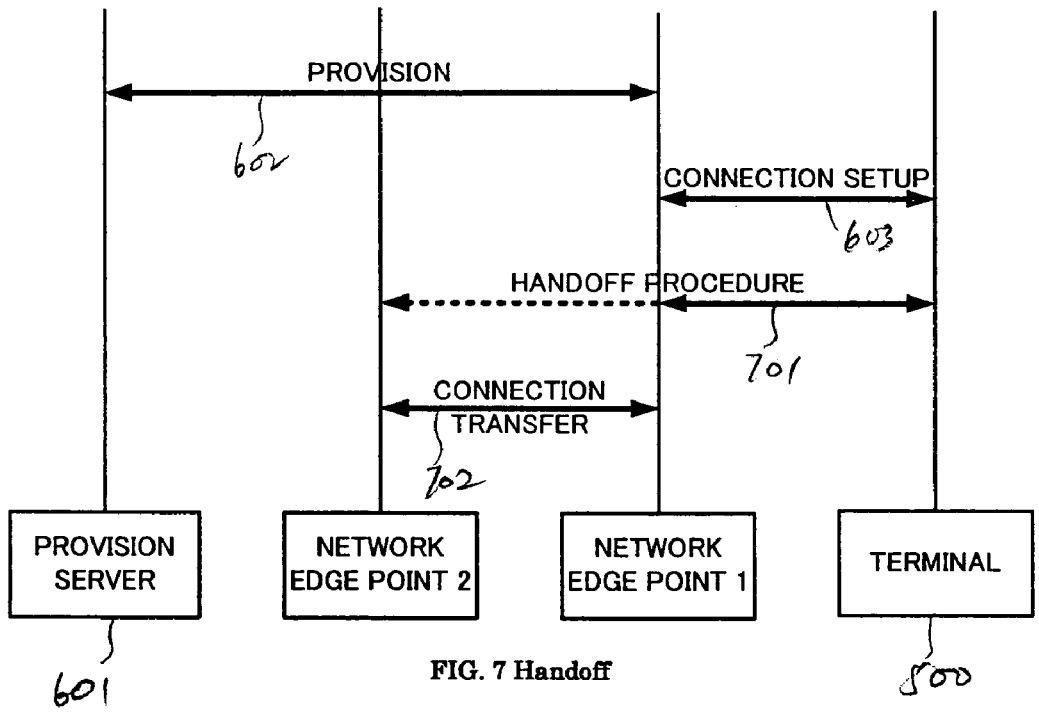
FIG. 7 Handoff

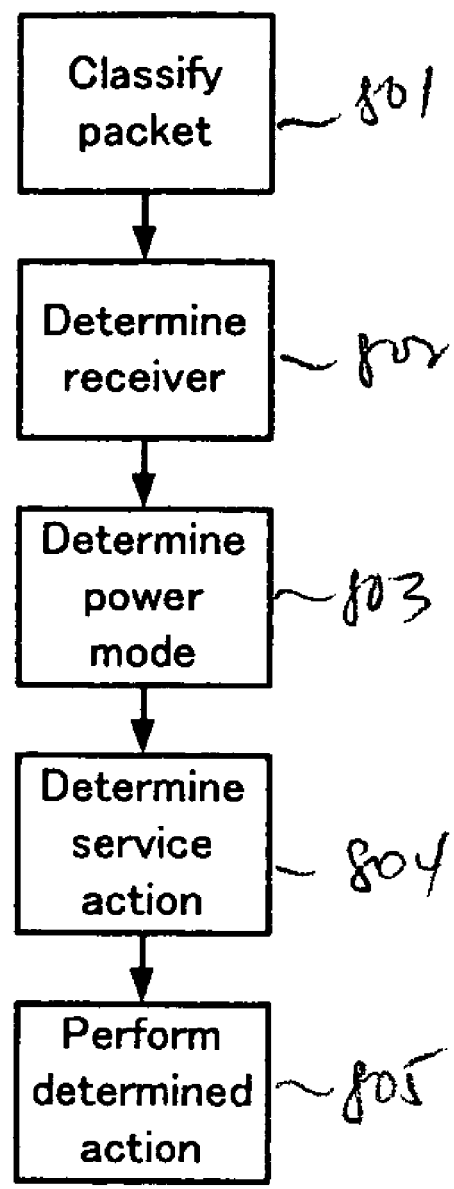
FIG. 8 Packet processing at network edge point

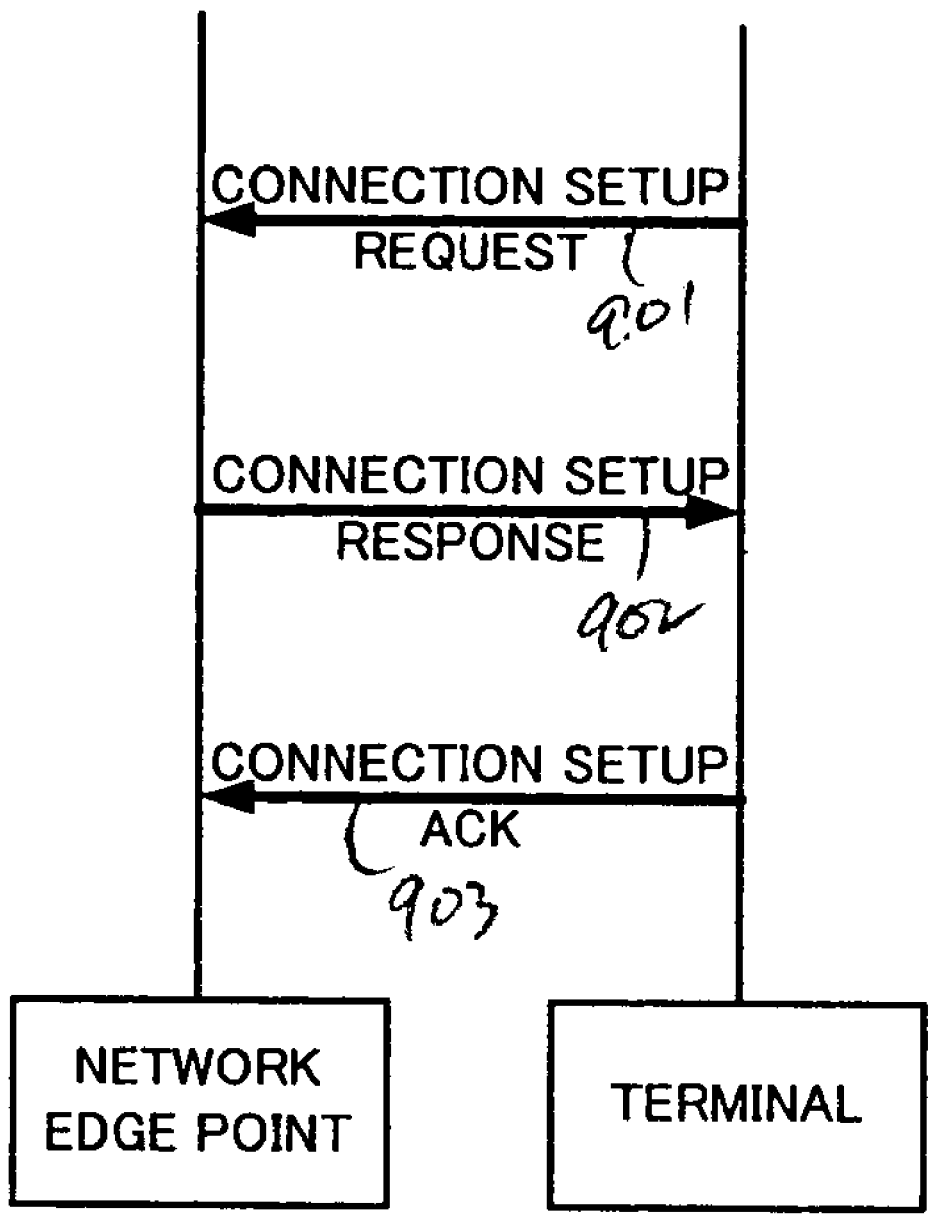
FIG. 9 Connection setup procedure

POWER MODE AWARE PACKET COMMUNICATION METHOD AND APPARATUS

CROSS-REFERENCE TO RELATED APPLICATIONS

The present application relates to, and claims priority of, (a) U.S. provisional patent application, entitled "Power Mode Aware Packet Communication Method and Apparatus," Ser. No. 60/581,683, filed on Jun. 22, 2004, (b) U.S. provisional patent application, entitled "Power Mode Aware Packet Communication Method and Apparatus," Ser. No. 60/601,411, filed on Aug. 13, 2004 and (c) U.S. provisional patent application, entitled "Power Mode Aware Packet Communication Method and Apparatus," Ser. No. 60/605,044. filed on Aug. 27, 2004.

BACKGROUND OF THE INVENTION

1. Field of the Invention

The present invention relates to protocols in a data network. In particular, the present invention relates to protocols used among network access device and terminals having power saving states.

2. Discussion of the Related Art

Many communication devices provide "normal" or "active" mode and "power-saving" modes of operation. Normal or active mode typically refers to the device's highest performance mode of operation, in which also is typically the mode with the highest power consumption. A power-saving mode, by contrast, is a mode of operation in which performance is traded off for a lower level of power consumption. Multiple modes of operations with different levels of performance and power consumption are found in most computers and communication devices today. For example, battery-powered devices in wireless communication systems, such as IEEE 802.11 WLAN (Wireless Local Area Network), IEEE 802.16 Wireless MAN (Metropolitan Area Network), GSM, IS-95, W-CDMA, CDMA 2000, all provide active and power-saving modes of operation. In particular, an IEEE 802.11 device has two power modes: an active (i.e., normal operation) and a power-saving mode. Under a power-saving mode, the device shuts off a part of its circuitry. Similarly, an IEEE 802.16 device has three power modes ("normal," "sleep," and "idle" modes), each mode having a prescribed level of communication and power-saving capabilities.

Under most conventional power-saving modes, a wireless terminal can be alerted (or paged). Typically, an alerted wireless terminal returns to an active mode of operation to process the packets which have arrived since the terminal entered the power-saving mode.

Some conventional power-saving modes trade-off power consumption and communication capabilities. However, in a conventional power-saving mode, a wireless terminal does not control whether or not packets arriving during a power-saving mode are to be delivered or discarded. For example, under the IEEE 802.11 standard, packets are buffered for later delivery. Under the latest IEEE 802.16 standard at the earliest priority date of this application, however, the packets are either discarded or delivered according to system settings. In addition, a conventional power-saving mode provides a wireless terminal little control over the alert mechanism. Generally, when a packet arrives at a time when the wireless terminal is in a power-saving mode, the wireless terminal is alerted. Efficiency suffers because a terminal lacks control of both packet disposition and the alert mechanism during a power-saving mode.

In a communication network, at times, some packets are of little interest to a wireless terminal. For example, a "Voice over IP" (VOIP) enabled wireless terminal running under the Windows CE operating system may discard all broadcast AppleTalk or IPX packets received. The same wireless terminal, however, may receive NetBIOS packets for file and printer sharing and Session Initiation Protocol (SIP) packets for initiating a VoIP session. Because the wireless terminal does not control packet disposition upstream, even packets of no interest are delivered. However, if the rule is for discarding all packets arriving during a power-saving mode, the performance of a desired service might deteriorate significantly, as its packets are also discarded.

Further, because the terminal lacks control over the alert mechanism, the terminal is alerted by any packet that arrives during a power-saving mode. Clearly, such an alert policy wastes power on undesired packets. In a real computer and communication network, different packet handling methods are required under different power-saving operations. For example, in a VoIP enabled wireless terminal running the Windows CE operating system, while both NetBIOS and SIP packets are relevant in one power mode (e.g. sleep mode in IEEE 802.16), only SIP packets are received in another power mode (e.g. idle mode in IEEE 802.16) to further conserve power.

In some applications, "classification" may be used to determine disposition of a packet. For example, packets may be classified according to source and destination addresses, port numbers and a protocol identifier. In some applications, disposition of a packet may be a decision based on both the identity of the wireless terminal (e.g., its MAC or IP address) and the port number. One example of such an application is a network firewall providing packet blocking services for a security purpose (e.g., to prevent unauthorized access). FIG. 1 is a block diagram showing conventional network firewall 100, including packet classifier 101 under direction of a filter table in filter manager 103. Packets classified to be acceptable are passed to their specific recipients, and packets deemed unacceptable are passed to dropper 102 to discard. Table 1 is an example of a filter table suitable for use in network firewall 100. In network firewall 100, packets are processed without regard to the recipients' power modes.

TABLE 1

Network Firewall Filter Table (Prior Art)

| Classifier | | | | | | |
|---|---|---|---|---|---|---|
| SRC ADDR | DST ADDR | SRC Port | DST Port | Protocol | Lifetime | Action |
| Any | 82.48.42.112 | Any | 21 | TCP | 0 | Deny |
| Any | 82.48.42.112 | 80 | Any | TCP | 1 | Allow |
| 82.48.42.112 | Any | 137 | 137 | UDP | Default | Deny |

In a communication system, "quality of Service" (QoS) capability (e.g., IEEE 802.16) is typically provided to each connection according to a QoS table based on packet classification. Table 2 is an example of a QoS table. FIG. 2 is a block diagram of conventional QoS enabled communication system 200, which includes classifier 201 and QoS mechanism 202. In QoS enabled communication system 200, multiple connections are maintained by connection manager 203. In this example, packets may be classified according to source and destination addresses, source and destination ports, protocol and connection identity (ID) information. According to their classifications, appropriate QoS actions are taken on the packets based on the QoS table. In communication system 200, a packet is also processed without regard to the recipients' power modes.

TABLE 2

Connection-Based QoS Table (Prior Art)

| Classifier | | | | | Connection ID | Action |
|---|---|---|---|---|---|---|
| SRC ADDR | DST ADDR | SRC Port | DST Port | Protocol | | |
| 82.68.42.56 | 82.48.42.112 | 80 | 3900 | TCP | 1 | QoS spec 1 |
| 82.68.42.56 | 82.48.42.112 | Any | 5004 | UDP | 2 | QoS spec 2 |
| Any | 82.48.42.113 | 139 | 139 | TCP | I | QoS spec 3 |

A packet communication method is desired in which each packet is processed according to the packet's classification and the power mode of its recipient. Further, it is also desired of such a packet communication network to determine whether or not to alert a recipient in a power-saving mode.

SUMMARY

The present invention provides both a method and an apparatus for packet communication in which a packet is processed according to a service table indexed by a packet's classification and each receiving terminal's power mode. The service may specify, for example, whether the packet is to be provided a predetermined quality of service or to be discarded based on the receiving terminal's power mode. The service may also specify whether a receiving terminal is to be alerted or paged. The services specified in the service table may pertain, for example, to a terminal, a provisioning server, or a handoff source. At the time when a multicast or broadcast packet is received, different receiving terminals may be in different power modes and thus, the service table may specify different services for the different terminals according to their respective power modes. The service table ensures that a terminal is provided at least the level of service indicated in the service table. As a result, a multicast or a broadcast packet is discarded only when the service table instructs discarding the packet for all terminals. The service table may also specify whether or not a terminal is to be alerted under each power state of a terminal. When a terminal makes a handoff between network access points, a part of the service table associated with the terminal may be transferred from the handoff source to the handoff destination.

The invention provides another way to trade-off between power saving and communication capability. By discarding less important packets and preventing the packets from triggering alerts (I,e., pages) to the wireless terminals, efficiency of existing power-saving modes can be further improved.

The above trade-off can be made in a flexible way based on the functionality of packet and the power mode of the terminals. Even when the packet is multicast or broadcast, such a flexible trade-off is possible for each receiving wireless terminal.

In one embodiment, the procedures for packet filters, load activation and QoS connection setup can be integrated into one.

The present invention enables fast and low overhead slaved activation of QoS and packet filtering mechanisms during power mode changes. Procedures for entering into and exiting from power saving modes can be used to trigger the activation or deactivation of QoS and packet filtering associated with the power mode. Consequently, fast activation and deactivation are achieved without additional separate signaling.

The present invention allows a low overhead and power efficient procedure for relocating a service table relevant to a new network attachment point during a wireless terminal handoff. By transferring the part of a service table associated with the wireless terminal from a current network edge point to another network edge point, a new service table is set up at the new network edge point with minimal signaling, thereby achieving low overhead and power efficiency.

The present invention also allows a low overhead procedure for retaining resources of terminals in power saving modes without sacrificing performance. This is achieved using a combination of slaved connection termination techniques and by providing resource retaining fields and power mode transition rules in control messages and connection establishment or change message.

The invention is achieved with minimal or no modification of existing hardware, using procedures that are analogous to those used for Quality of Service (QoS) functions and packet filtering. Thus, the present invention may be achieved with minimal implementation costs and operation overheads. The packet classification hardware and the memory allocated to service tables, classification rule tables, service rule tables, and alerting rule tables can be shared.

The present invention is better understood upon consideration of the detailed description below and the accompanying drawings.

BRIEF DESCRIPTION OF THE DRAWINGS

FIG. 1 is a block diagram showing conventional network firewall 100 having filter manager 103, which operates in conjunction with packet classifier 101 and packet dropper 102.

FIG. 2 is a block diagram of conventional QoS enabled communication system 200, which includes classifier 201 and QoS mechanism 202 for providing QoS services according to a service table.

FIG. 3 shows communication system 300, which includes network 301 having network edge points or access points 302 and 303.

FIG. 4 is a functional block diagram of network edge point 400 in according with one embodiment of the present invention.

FIG. 5 is a functional block diagram of terminal 500 according to the present invention.

FIG. 6 shows a provisioning process, in accordance with one embodiment of the present invention.

FIG. 7 shows a handoff procedure by which a terminal detaches from one network edge point and attaches to another.

FIG. 8 shows flow chart 800, illustrating exemplary packet process procedures 801-805 at an network edge point.

FIG. 9 illustrates a connection setup procedure, in which a terminal sends a connection setup request message.

DETAILED DESCRIPTION OF THE PREFERRED EMBODIMENTS

The invention provides a power mode aware packet communication system, which avoids delivering undesired packets or alerting wireless terminals unnecessarily, thereby saving power. The present invention is applicable to a communication system, such as communication system 300 of FIG. 3, which includes network 301. As shown in FIG. 3, network 301 is accessible through network edge points or access points 302 and 303. FIG. 3 also shows network device 307, which is directly attached to network 301, and terminals 304, 305 and 306, which are connected to network 301 through network edge points 302 and 303. Network 301 may be a global network, such as the Internet, a metropolitan area network (MAN), a wide area network (WAN), or a local area network (LAN). Alternatively, network 301 may include also a core network, a backbone network, a backhaul network, or an access network. The present invention is applicable to communication between terminals coupled to the same network edge point (e.g., terminals 305 and 306 connected to network edge point 302), or between any two or more terminals coupled to the network 301 in any way. The communication may be associated with inbound packets (i.e., going from a terminal to a network edge point), outbound packets (i.e., going from a network edge point to a terminal), or both.

Network edge points 302 and 303 each may be an access point under the IEEE 802.11 standard, a base station under any of the IEEE 802.16, GSM, IS-95, W-CDMA and CDMA 2000 standards, a hub in IEEE 802.3 Ethernet network, a point-to-point protocol (PPP) server of an internet service provider (ISP), a business enterprise or other dial-up network, or any networked edge point of LANs, WANs, MANs, satellite networks, Bluetooth networks or any other type of networks.

FIG. 4 is a functional block diagram of network edge point 400 in accordance with one embodiment of the present invention. As shown in FIG. 4, network edge point 400 includes classifier 401, connection manager 402, power mode manager 403, service manager 404, QoS mechanism 407, dropper 408, provision manager 405, and handoff manager 406. Although not expressly shown in FIG. 4, other functional blocks may also be provided in network edge point 400. Connection manager 402 may communicate with a counterpart connection manager in a terminal (e.g., connection manager 501 of FIG. 5), provision manager 405, and handoff manager 503 to setup, change, and terminate a connection, respectively.

In this embodiment, terminals 304, 305, 306 and 307 each may be a desktop computer, a server, a laptop computer, a personal digital assistant (PDA), a pocket PC, a wireless telephone, a cellular phone, a smart phone, a data card, a PCMCIA card, an USB stick, or another communications enabled chip or device. Each of terminals 304, 305, 306 and 307 may be configured as a client, as a server, or as a peer (for peer-to-peer communications). Communication may be conducted, for example, over wireless communication. Further, each terminal may be battery-powered.

FIG. 5 is a functional block diagram of terminal 500 according to the present invention. As shown in FIG. 5, terminal 500 may include connection manager 501, power mode manager 502, handoff manager 503 and any other functional blocks useful for packet communication. Connection manager 501 communicates with its counterpart in a network edge point (e.g., connection manager 402 of network edge point 400) regarding classification rules, service tables, service rules, and paging rules, as appropriate. Similarly, power mode manager 502 may communicate its power mode to its counterpart in a network edge point (e.g., power mode manager 403 of network edge point 400). Power mode manager 502 determines a suitable power mode for terminal 500, based on, for example, the operating system, installed and running services or applications, the current power mode or the battery status. Whenever a power mode is changed, power mode manager 502 communicates the power mode change to connection manager 501.

FIG. 8 shows flow chart 800, illustrating an exemplary packet processing procedure at a network edge point, such as network edge point 303 of FIG. 3. Flow chart 800 includes steps 801-805. At step 801, when an outbound packet designating a terminal is received from network 301 or received at a network edge point (e.g., network edge point 302), classifier 401 classifies the received packet according to an applicable classification rule installed by connection manager 402. For example, classifier 401 may classify packets according to a "connection" identifier, which also identifies one or more receiving terminals (step 802). At step 803, the power mode of each receiving terminal may be determined by power mode manager 403. At step 804, the classified packet is provided to service manager 404 which determines the processing requirement of the packet (i.e., the specified action) from a service table installed by connection manager 402. The processing requirement may be, for example, delivering the packet to QoS mechanism 407, or discarding the packet in dropper 408. The specified action may be determined from the service table, for example, from the packet's classification and the power mode of each receiving terminal. The specified action is performed at step 805. In addition, the service table may also specify whether a receiving terminal in a power-saving mode should be alerted, according to an alerting rule. Examples of alerting mechanisms include paging schemes under IS-95, CDMA-2000, GSM, W-CDMA, or other cellular systems, traffic indication scheme under IEEE 802.11, paging schemes and traffic indication schemes under IEEE 802.16.

The present invention is applicable to a wide variety of packets at various protocol layers, such as Medium Access Control (MAC) layer frame, Logical Link Control (LLC) frame, Internet Protocol (IP) packet, Asynchronous Transfer Mode (ATM) cell, datagram, or any other type of network message under a packet-based protocol. The present invention may be applicable to (a) network messages for specific services, such as voice over IP (VoIP), video teleconferencing, text messaging, file sharing, video streaming, audio streaming, web browsing, short messaging, multimedia broadcasting or multicasting, e-mail, or another communication format; (b) network messages for specific operating systems (OS), such as NetWare, AppleTalk, UNIX, Windows, or Windows CE; (c) network messages for internetwork packet exchange (IPX), sequenced packet exchange (SPX), routing information protocol (RIP), NetWare link services protocol (NLSP), network basic input/output system (NetBIOS), NetBIOS extended user interface (NetBEUI), EtherTalk link access protocol (ELAP), LocalTalk Link Access Protocol (LLAP), TokenTalk Link Access Protocol (TLAP), or datagram delivery protocol (DDP); and (d) network messages for transmission control protocol (TCP), user datagram protocol (UDP), session initiation protocol (SIP), trivial file transfer protocol (TFTP), file transfer protocol (FTP), real time protocolg (RTP), hypertext transfer protocol (HTTP), DHCP (Dynamic Host Configuration Protocol) discovery, DHCP request, agent advertisements, router advertisements, neighbor discovery, multicast listener discovery (MLD), internet group management protocol (IGMP), or any kinds of internet control message protocol (ICMP). The packet may include control messages, management messages, or data messages. Table 3 is an exemplary message format that may be used for communication between a network edge point and a terminal, or between the two network edge points. As shown in Table 3, the message format may indicate a destination (DST) and a source (SRC), which may be specified as an IP address, a MAC address, an LLC address, or any other address or identifier that identifies the destination and the source of the message. The packets may be unicast, multicast, or broadcast.

TABLE 3

Message format

| DST | SRC | CMD |
|---|---|---|

In Table, 3, an additional field provides a coded or uncoded command (CMD). Some examples of applicable commands are provided in Table 4. A message may be piggybacked by one or more other data messages, control messages, management messages, or any other network messages. Each message may include more than one CMD.

TABLE 4

Commands

| CMD | Message |
|---|---|
| 1 | Connection setup request |
| 2 | Connection setup response |
| 3 | Connection setup ACK |
| 4 | Connection change request |
| 5 | Connection change response |
| 6 | Connection change ACK |
| 7 | Connection close request |
| 8 | Connection close response |
| 9 | Sleep mode request |
| 10 | Sleep mode response |
| 11 | Traffic indication |
| 12 | Idle mode request |
| 13 | Idle mode response |
| 14 | Paging |
| 15 | Handoff request |
| 16 | Handoff response |
| 17 | Connection transfer request |
| 18 | Connection transfer response |
| 19 | Connection transfer ACK |

A terminal may specify the type of packets that it wished to receive, by specifying the packets' source and destination addresses, its operating system (OS), its installed or running services or applications, its current power mode, its battery status, or any other state information. According to the present invention, a network edge point may discard undesired packets without alerting the terminal, thus achieving power saving.

Under an active or normal mode operation (e.g., an active mode under IEEE 802.11, a normal mode under IEEE 802.16, an access state or traffic channel state under IS-95, a system access state under CDMA-2000, or a dedicated mode under GSM), a terminal may be more tightly coupled to the network, transmitting or receiving packets, preparing to transmit or receive a packet, or carrying out other communication processes. Many levels of power saving modes may be provided. Typical power-saving modes may include sleep, dormant, idle, standby, or hibernated modes. Under a power-saving mode (e.g., a power-saving mode under IEEE 802.11, an idle mode or a sleep mode under IEEE 802.16, an idle state or mode under IS-95, CDMA-2000, or GSM), a terminal may be relatively more loosely coupled to the network, with restrictions imposed upon its operations, including its network communications. A terminal in a power-saving mode may be restricted to receiving or transmitting only specific types of packets, within specific time or slots, using specific channels, or under other operational constraints. Such restrictions allow a terminal in a power-saving mode to cut off power from circuits not necessary for providing the restricted capabilities.

A terminal in a power-saving mode may still select or reselect network edge points, or transfer channels (e.g., paging or quick paging channels, common signaling channels) it monitors from one network edge point to another, for example. In some applications, the monitored channels transmit only during specified time slots which occur periodically, pseudo-periodically, or aperiodically according to predetermined rules. The monitored channel may include beacon frames which may be transmitted by network edge points periodically, pseudo-periodically, or aperiodically. Alternatively, the monitored channels may be defined by a set of codes, a set of sub-channels, a set of sub-carriers, a set of frequency hopping patterns. The terminal may have registered on the network and may be listening for a predetermined message (e.g., an alerting message, a paging message, a traffic indication message). The terminal may perform location updates when necessary.

According to one embodiment of the present invention, when a terminal changes its power mode, the terminal and a network edge point with which the terminal associates exchange power mode transition messages. In one implementation, the messages exchanged may include, for each transition type, a "request for power mode transition," and a response to the request. The request message may be initiated by either the terminal or the network edge point, and the response message is sent by the party receiving the request message. Table 4 above includes examples of these power mode transition messages (e.g., a sleep mode request, a sleep mode response, an idle mode request, and an idle mode response). As with other messages, the power mode transition message may be piggybacked by other network messages. Alternatively, the power mode transition message may also be implicit. For example, a network message that relates to an operation performed only in a power mode different from the current power mode of the terminal may be treated as including implicitly a power mode transition message, so as to allow the terminal to enter the power mode in which the operation may be performed. For example, in a packet communication system having a normal mode, a sleep mode, and an idle mode, a data message sent by a terminal in a sleep mode or idle mode, and an ACK message sent by a network edge point may be treating as including, respectively, a power mode transition request for exiting the sleep mode or the idle mode, and a corresponding response.

A power mode transition message may also include a resource retention field (RSC RTN), such as shown in Table 5. Such a power mode transition message is a variation of the messages of Table 3 above. Exemplary values for the RSC RTN field are shown in Table 6. The resource retention field may specify a request, a response, a preference, a command, or a policy by a terminal or a network edge point regarding the treatment of resources allocated at the network edge point to the terminal for the duration within which the terminal is in the specified power mode. The value in the resource retention field may be interpreted as a request for the retaining the associated resource for the terminal.

TABLE 5

Power mode transition message (resource retention field)

| DST | SRC | CMD | RSC RTN |
|---|---|---|---|

TABLE 6

Resource retention field

| Field value | Resource retaining behavior |
|---|---|
| 1 | No resource for any connections are retained |
| 2 | Only the resource for connection(s) with the predetermined connection type(s) is retained |
| 3 | Only the resource for connection(s) with the resource retaining rule of "To retain" is maintained |
| 4 | Only the resource for connection(s) with the alerting rule of "To alert" is maintained |
| ... | ... |
| N | Resource of all connections is maintained |

As shown in Table 6, a value '1' at the resource retention field is treated as a request that the resources for all connections are to be released. The network edge point would free up all resources for the terminal (i.e., all entries and resources in service table, alerting rule table, classification rule table, service rule table, classifier, scheduler, poller, policer, shaper, buffer, bandwidth allocation unit, and resource reservation unit), when the terminal transitions to a power-saving mode. Of course, under such a resource retention policy, a terminal may suffer from QoS degradation, undesirable packet blocking, undesirable packet delivery, undesirable alerting, and undesirable lack of alerting. Another example corresponds to the case in which the resource retention field is 'N'. As shown in Table 6, under that resource retention policy, all resources are to be retained. By retaining all resources, a terminal may enjoy better QoS, and the recovery from a power-saving mode to normal mode may be faster and smoother. However, the burden on the network edge point is correspondingly higher.

As yet another example, corresponding to a value of '2' in the resource-retention field, resources are retained only for specified types of connections. Which connection types merit resource retention are determined by weighing the overhead costs of resource retention against the attendant benefits, considering such factors as the functions performed by the connection types, the QoS required for the connection types, the associated overhead costs of resource retention, and the total available resources at the network edge point. For example, a network edge point of a packet communication system may retain resources for basic, primary management and secondary management connections after considering the factors enumerated above.

In Table 6, the cases corresponding to values '3' and '4' represent retention policies in which resources are retained only by specific requests or as required by an alert rule. Because these policies involve evaluations involving factors in addition to merely connection types, a greater range of flexibility and finer control for greater power-saving are made possible.

Referring back to FIG. 4, power mode manager 403 of network edge point 400 may send an alerting message to terminal 500. Tables 7 and 8 show the formats of a traffic indication message and a paging message, respectively. The message formats in Tables 7 and 8 are variations to the message format of Table 3. As these alerting messages may be broadcast or multicast, the receiving terminals may be specified separately from the destination address (DST). For example, the terminals may be specified in the traffic indication field or the paging info field of the messages shown in Tables 7 and 8.

TABLE 7

Traffic indication message

| DST | SRC | CMD | Traffic indication |
|---|---|---|---|

TABLE 8

Paging message

| DST | SRC | CMD | Paging info |
|---|---|---|---|

An alerting message from a network edge point may convey information regarding pending packets for the terminal. Alternatively, the alerting message may be a request to the terminal for performing operations such as ranging, scanning, location update, acknowledgement, idle handoff, handoff, or a request for changing the power mode. The information or request in an alerting message may be interpreted by a power mode manager of the terminal (e.g., power mode manager 502 of terminal 500). Upon receiving the message, the terminal may initiate the required operation, to receive the pending packets or to respond to the request, as appropriate.

According to one embodiment of the present invention, a power mode manager (e.g., power mode manager 403 of network edge point 400) maintains an alert rule table to determine if an alerting message should be sent to a receiving terminal, according to packet classification, the identity of the receiving terminal, and the terminal's power mode. One example of an alerting rule table is shown in Table 9 below.

TABLE 9

Alerting Rule Table

| Connection ID | Receiver ID | Power status | Alert |
|---|---|---|---|
| 1 | 1 | Sleep | O |
|  |  | Idle | X |
| 2 | 1 | Sleep | X |
|  |  | Idle | X |
| ... | ... | ... | ... |
| i | 2 | Sleep | O |
|  |  | Idle | X |
| i + 1 | 1 | Sleep | X |
|  |  | Idle | X |
|  | 2 | Sleep | O |
|  |  | Idle | X |
| ... |  | ... | ... |
|  | N | Sleep | X |
|  |  | Idle | X |
| ... | ... | ... | ... |
| M | N | Sleep | O |
|  |  | Idle | O |

As shown in Table 9, when a packet designating connection ID '1' and receiver ID '1' is received while the receiving terminal is in sleep mode, an alerting message is sent to the receiving terminal. Similarly, as shown in Table 9, a packet designating connection ID '2' and receiver ID '1' would not trigger an alerting message, regardless of whether the receiving terminal is in sleep mode or idle mode.

A power mode manager of a network edge point (e.g., power mode manager 403) may maintain a terminal power status table (e.g., Table 10), which stores a current power mode for each associated terminals. The terminal power status table is updated when a power mode of a terminal is changed. Through the power mode manager, the terminal power status table may be accessed by other functional blocks of the network edge point, such as a service manager (e.g., service manager 404), or a QoS mechanism (e.g., QoS mechanism 407).

TABLE 10

Terminal Power status table

| Terminal ID | Power status |
|---|---|
| 1 | Normal |
| 2 | Sleep |
| ... | ... |
| N | Idle |

The power mode manager of a network edge point may maintain an alerting rule table, such as Table 9, so as to provide an alerting message service. Alternatively, the alert rule table may be incorporated into a service table under control of a connection manager (e.g., connection manager 402) of the network edge point. In that case, upon receiving a packet from the network, the power mode manager of the network edge point communicates with the connection manager to access the service table.

In this detailed description, the term 'connection' refers to a group of data packets that flow between a network edge point and a terminal which are associated with a particular service. For example, a connection may represent a virtual channel or a virtual path in ATM, a traffic stream or a traffic flow in IEEE 802.11e, a connection or a service flow in IEEE 802.16, a connection, a session, a flow, or a service in GSM, W-CDMA, IS-95, W-CDMA, IETF integrated service (IntServ). In this sense of the word, a connection may encompass data traffic both under a connection-oriented protocol and a connectionless protocol (e.g., Internet Protocol (IP)). Multiple virtual paths, virtual channels, traffic streams, traffic flows, connections, service flows, sessions, or flows may be served by a single connection. Conversely, a virtual path, a virtual channel, a traffic stream, a traffic flow, a connection, a service flow, a session, or a flow may be served by multiple connections. In one embodiment, a connection may be identified by packet classification, and may be associated with a "connection identifier" (CID). As discussed above, a classifier is a set of matching criteria applied to a packet. The matching criteria may be protocol-specific packet attributes (e.g., destination IP address). Examples of connections grouped by classification are shown in Tables 11 and 12. Each connection in Table 12 is explicitly associated with a CID. Tables 11 and 12 illustrate classifications based on source MAC address (SRC MAC ADDR), destination MAC address (DST MAC ADDR), frame type (FRM Type), source IP address (SRC IP ADDR), destination IP address (DST IP ADDR), source port (SRC Port), destination port (DST Port), and protocol filed (Protocol).

Although not shown in Table 11 (to simplify this description), an alerting rule may also be provided for each connection.

Packet classification may be based on an ATM header, a MAC header, an LLC header, an IP header, a TCP header, a UDP header, or any other header, body, trailer, or any other part of a data packet. For example, in an ATM connection—which is uniquely identified by the values of a virtual path identifier (VPI) and a virtual channel identifier (VCI)—packet classification may be based on the VPI and VCI fields in the ATM cell header. As another example, for an IEEE 802.3 packet, packet classification can be based on the destination MAC address, source MAC address, and Ethertype/SAP fields. For an IP packet, for example, packet classification may be based on the Type of Service field, Protocol field, IP source address, IP destination address, source port, and destination port. Packet classification may be based on masked or unmasked fields.

TABLE 11

Service table in a network edge point

| Classifier | | | | | | | | Power Mode Conditioner | | |
|---|---|---|---|---|---|---|---|---|---|---|
| SRC MAC ADDR | DST MAC ADDR | FRM Type | SRC IP ADDR | DST IP ADDR | SRC Port | DST Port | Protocol | RCV ID | Power status | Action |
| Any | Any | IP | 82.68.42.56 | 82.48.42.112 | 80 | 3900 | TCP | 1 | Normal Sleep Idle | QoS spec 1 QoS spec 2 Discard |
| Any | Any | IP | 82.68.42.56 | 82.48.42.112 | Any | 5004 | UDP | 1 | Normal Sleep Idle | Qos spec 3 Discard Discard |
| . | . | . | . | . | . | . | . | . | . | . |
| Any | Any | IP | Any | 82.48.42.113 | 139 | 139 | TCP | 2 | Normal Sleep Idle | QoS spec j QoS spec k Discard |
| Any | Broadcast | IP | Any | Any | 138 | 138 | UDP | 1 | Normal Sleep Idle | QoS spec 1 Discard Discard |
| | | | | | | | | 2 | Normal Sleep Idle | QoS spec 1 QoS spec 2 Discard |
| | | | | | | | | . | . | . |

TABLE 11-continued

Service table in a network edge point

| Classifier | | | | | | | | Power Mode Conditioner | | |
|---|---|---|---|---|---|---|---|---|---|---|
| SRC MAC ADDR | DST MAC ADDR | FRM Type | SRC IP ADDR | DST IP ADDR | SRC Port | DST Port | Protocol | RCV ID | Power status | Action |
| | | | | | | | | N | Normal | Discard |
| | | | | | | | | | Sleep | Discard |
| | | | | | | | | | Idle | Discard |
| . | . | . | . | . | . | . | . | . | . | . |
| . | . | . | . | . | . | . | . | . | . | . |
| . | . | . | . | . | . | . | . | . | . | . |
| Any | Any | IP | Any | 82.48.42.14 | Any | 5060 | UDP | N | Normal | QoS spec 1 |
| | | | | | | | | | Sleep | QoS spec 2 |
| | | | | | | | | | Idle | QoS spec 4 |

TABLE 12

Classification rule table

| Classifier | | | | | | | | |
|---|---|---|---|---|---|---|---|---|
| SRC MAC ADDR | DST MAC ADDR | Frame Type | SRC IP ADDR | DST IP ADDR | SRC Port | DST Port | Protocol | CID |
| Any | Any | IP | 82.68.42.56 | 82.48.42.112 | 80 | 3900 | TCP | 1 |
| Any | Any | IP | 82.68.42.56 | 82.48.42.112 | Any | 5004 | UDP | 2 |
| . | . | . | . | . | . | . | . | . |
| . | . | . | . | . | . | . | . | . |
| Any | Any | IP | Any | 82.48.42.113 | 139 | 139 | TCP | i |
| Any | Broadcast | IP | Any | Any | 138 | 138 | UDP | i + 1 |
| . | . | . | . | . | . | . | . | . |
| . | . | . | . | . | . | . | . | . |
| Any | Any | IP | Any | 82.48.42.14 | Any | 5060 | UDP | N |

Several classifiers may exist for the same data service. Thus, a classifier ordering scheme may be used in applying the classifiers to the packets. An explicit ordering may be necessary where the patterns used by the classifiers may overlap. An ordering scheme need not be unique, but should unambiguously select the applicable classifier. To process a packet, a classifier in a network edge point (e.g., classifier 401 of network edge point 400) accesses a classification rule in a service table (e.g., Table 11) through a connection manager (e.g., connection manager 402). Alternatively, a classifier may maintain its own classification rule table (e.g., Table 12), in which case, the classifier is informed of changes impacting the classification rule table by the connection manager (e.g., connection manager 402).

Table 13 is an example of a service table maintained by a connection manager of a terminal (e.g., connection manager 501 of terminal 500). As shown in Table 13, the service table includes a classification rule and a service rule. Although not shown in Table 13 (to simplify this description), an alerting rule may also be provided for each connection.

TABLE 13

Service table in a terminal (Receiver ID: 1)

| Classifier | | | | | | | | Power Mode Conditioner (Power status) | Action |
|---|---|---|---|---|---|---|---|---|---|
| SRC MAC ADDR | DST MAC ADDR | FRM Type | SRC IP ADDR | DST IP ADDR | SRC Port | DST Port | Protocol | | |
| Any | Any | IP | 82.68.42.56 | 82.48.42.112 | 80 | 3900 | TCP | Normal | QoS spec 1 |
| | | | | | | | | Sleep | QoS spec 2 |
| | | | | | | | | Idle | Discard |
| Any | Any | IP | 82.68.42.56 | 82.48.42.112 | Any | 5004 | UDP | Normal | QoS spec 3 |
| | | | | | | | | Sleep | Discard |
| | | | | | | | | Idle | Discard |
| . | . | . | . | . | . | . | . | . | . |
| . | . | . | . | . | . | . | . | . | . |
| . | . | . | . | . | . | . | . | . | . |

TABLE 13-continued

Service table in a terminal (Receiver ID: 1)

| Classifier | | | | | | | | Power Mode | |
|---|---|---|---|---|---|---|---|---|---|
| SRC MAC ADDR | DST MAC ADDR | FRM Type | SRC IP ADDR | DST IP ADDR | SRC Port | DST Port | Protocol | Conditioner (Power status) | Action |
| Any | Broadcast | IP | Any | Any | 138 | 138 | UDP | Normal Sleep Idle | QoS spec 1 Discard Discard |

The service tables of each terminal associated with a network edge point are communicated to the network edge point through connection setup and change procedures, as explained in further detail below. These service tables are incorporated into the service table of the network edge point (e.g., the service table of in Table 11).

To setup, change, or terminate a connection, the respective connection managers of a terminal and a network edge point exchange "connection management messages". The connection management message may include a connection setup request message, a connection setup response message, and a connection setup ACK message, as shown in Table 4. Tables 14, 15 and 16 show exemplary formats of a connection setup request, connection setup response, and connection setup ACK messages for normal, sleep, and idle power modes, respectively.

TABLE 14

Connection setup request message

| DST | SRC | CMD | Classifier | Normal mode action | Sleep mode action | Idle mode action |
|---|---|---|---|---|---|---|

TABLE 15

Connection setup response message

| DST | SRC | CMD | Classifier | Normal mode action | Sleep mode action | Idle mode action | Connection ID |
|---|---|---|---|---|---|---|---|

TABLE 16

Connection setup ACK message

| DST | SRC | CMD | Connection ID |
|---|---|---|---|

FIG. 9 illustrates a connection setup procedure, in which a terminal sends a connection setup request message (step 901), such as that shown in Table 14. In response, the network edge point responds by sending a connection setup response message (step 902). The terminal then acknowledges receipt of the connection setup response message by sending the network edge point a connection setup ACK message (step 903).

The connection setup request message may specify, for example, the network edge point's address in the DST field, the terminal's address in the SRC field, a value '1' in the CMD field, and the classification rule for the connection in the Classifier field. As shown in Table 14, the message may also include an action field for specifying a coded or uncoded service rule for each of the normal, sleep and idle power modes. For example, the service rule may be 'to discard the packet', 'to deliver the packet', 'to deliver with a particular QoS specification'. When the service rule is coded, it may be coded as a TLV value (i.e., type, length, and variable).

TABLE 17

Connection setup request message (QoS spec)

| AD NE | AD TE | 1 | Classifier 1 | QoS spec 1 | QoS spec 2 | Discard |
|---|---|---|---|---|---|---|

Table 17 shows an exemplary instance of a connection setup request message. As shown in Table 17, this connection setup request message specifies for the normal, sleep and idle modes the service rules of 'QoS spec 1' delivery, 'QoS spec 2' delivery, and 'discard,' respectively. The addresses for the network edge point (AD NE) and the terminal (AD TE) are provided in the DST and SRC fields, respectively. Table 17 illustrates a system which alerts a terminal only when a packet is delivered. Under such a system, alerting rules need not be expressly provided in a connection setup request message. However, if a more sophisticated alerting mechanism is associated with the power modes, the alerting rules may be included in the respective action fields, as shown in the exemplary connection setup request message of Table 18. As shown in Table 18, 'alert' and 'not to alert' are specified for the sleep and idle modes, respectively. The alerting rule may be provided as a boolean value (i.e., complementary logic values for 'alert' and 'not to alert.')

TABLE 18

Connection setup request message (QoS spec & alert)

| AD NE | AD TE | 1 | Classifier 1 | QoS spec 1 | QoS spec 2 Alert O | Discard Alert X |
|---|---|---|---|---|---|---|

In one embodiment, a default service rule is provided for each power mode. For example, the default service rule for the sleep mode may be 'QoS spec 2', while the default service rule for the idle mode may be 'discard'. With default service rules, the service rule for such a power mode need not be explicitly included in the power setup request message. Table 19 is an exemplary connection setup request message which specifies expressly the alerting rules for the sleep and idle modes, but allows the service rules for these power modes to be specified implicitly.

TABLE 19

Connection setup request message (Alert)

| AD NE | AD TE | 1 | Classifier 1 | QoS spec 1 | Alert O | Alert X |
|---|---|---|---|---|---|---|

In one embodiment, a default QoS specification (e.g., 'QoS spec 2') is provided for a particular power mode (e.g., sleep mode). A boolean value may then be used in the action field (i.e., complementary logic values for 'deliver' and 'discard.'), such as shown in Table 20.

TABLE 20

Connection setup request message (Deliver/discard & alert)

| AD NE | AD TE | 1 | Classifier 1 | QoS spec 1 | Deliver Alert O | Discard Alert X |
|---|---|---|---|---|---|---|

If a system has both a default service rule and a default alerting rule for each power mode, a connection setup request message need not specify an action for each power mode. Table 21 shows a connection setup request that assumes a default service rule (e.g., 'deliver packet') and a default alert rule (e.g., 'alert') for the sleep mode.

TABLE 21

Connection setup request message (Default Sleep mode)

| DST | SRC | CMD | Classifier | Normal mode action | Idle mode action |
|---|---|---|---|---|---|

As mentioned above, Table 15 shows an exemplary format for a connection response message that responds to a corresponding connection setup request message. When a terminal initiates the connection setup procedure, as shown in step 901 of FIG. 9, the connection setup response message specifies the network edge point's address in the SRC field, the terminal's address in the DST field, and a value '2' in the CMD field. The connection setup response message can have a classifier field, and action fields for each of the normal, sleep and idle power modes. The classifier and action fields enable negotiation over the values of these fields between the network edge point and the terminal. For example, the network edge point may propose a downgraded QoS specification as the service rule for the normal mode when the network edge point does not have enough resources to support the QoS requested by the terminal. If such a negotiation is not required, a connection setup response message may simply include a boolean value indicating whether or not the network edge point accepts classifier and actions specified in the terminal's connection setup request message. The network edge point may specify a value in a connection ID (CID) field to identify the corresponding connection between the network edge point and the terminal, which may be used in subsequent messages concerning this connection. (The CID field would be included in a connection setup request message by the network edge point.) Note that, the value in the CID field in the connection setup messages need not be what is used internally for connection ID used in the network edge point.

When a terminal sends the connection setup ACK message, the message specifies the network edge point's address in the DST field, the terminal's address in the SRC field, and a value '3' in the CMD field.

If a power saving mode is associated with a slaved connection termination (i.e., a connection termination that is triggered by a specified event, such as a power mode transition), the connection setup request need not include an action field for each power mode. For example, if the idle mode is associated with a slaved connection termination, the connection setup request message need not provide an action field for the idle mode, as shown in Table 22.

TABLE 22

Connection setup request message (Slaved termination for idle mode)

| DST | SRC | CMD | Classifier | Normal mode action | Sleep mode action |
|---|---|---|---|---|---|

Where a power saving mode is associated with a slaved connection termination, a terminal or a network edge point may request that a specified connection be excluded from the slaved connection termination. The corresponding connection setup request message may have a resource retention rule field for expressing the resource retention rule (or preference) for that connection. Table 23 shows an exemplary format of a connection setup request message that allows specifying in the resource retention rule field a connection to be excluded from a slaved connection termination. The value of the resource retention rule field may be a boolean value, specifying 'retain' or 'not to retain.' The action for the power mode may be determined by the default behavior or by an action field delivered in the same connection request message or in a subsequent connection change message.

TABLE 23

Connection setup request message (Requesting Retaining Rule for the Idle mode)

| DST | SRC | CMD | Classifier | Normal mode action | Sleep mode action | Resource retention rule |
|---|---|---|---|---|---|---|

As an alternative to the resource retention rule field, the connection setup request may have an action field for a power mode. The presence of an action field for the power mode is interpreted as an implicit request for resource retention for the action. The format for a connection setup request message that has an idle mode action field is already shown in Table 14 above.

If a power mode is associated with a slaved activation or deactivation of a connection (i.e., activation or deactivation of a connection is triggered by a specified event, such as a power mode transition), a terminal or a network edge point may request a specified connection to be excluded from the slaved connection activation or deactivation. The connection setup request message may thus include a field or fields for requesting the exclusion of the connection from the slaved activation, deactivation, or both. For example, when a terminal transits from a normal mode to an idle mode, all connections associated with the terminal may be terminated to release the resources.

Exclusion from a slaved operation (termination, activation, or deactivation) may be requested whenever a connection setup request message is exchanged. Connections may be excluded one by one or all at once (i.e., by a single omnibus request) at the time when the terminal is coupled to a network edge point, or when a power mode transition messages are exchanged. For example, when a power mode transition message is used as a single request for all connections to be excluded from the slaved connection termination, the resource retention field of the transition message may have the value of "N", as shown in Table 6 above.

Alternatively, service rules need not be specified one connection at a time. Instead, service rules for more than one connection can be delivered in a single message that incorporates multiple CMDs with other accompanying relevant fields. Table 24 shows an exemplary message which includes two CMDs, each being accompanied by a classifier (CSF) field, a normal mode action (NMA) field, a sleep mode action (SMA) field, and an idle mode action (IMA) field.

TABLE 24

Delivery of Service Rules for Multiple Connections

| DST | SRC | CMD 1 | CSF 1 | NMA 1 | SMA 1 | IMA 1 | CMD 2 | CSF 2 | NMA 2 | SMA 2 | IMA2 |
|---|---|---|---|---|---|---|---|---|---|---|---|

When there the same CMD is specified for more than one connection, efficiency may be achieved by specifying only a single CMD. The accompanying fields for each connection may nevertheless have to be specified. TABLE 25 illustrates an exemplary message for delivering service rules for two connections under the same CMD. In Table 25, the fields for each connection appear as in a group ("connection oriented list"). For example, CMD 1, CSF 1, NMA 1, SMA 1 and IMA 1 are fields pertaining to connection 1, and are thus grouped together.

TABLE 25

Delivery of Service Rules for Multiple Connections having a common CMD

| DST | SRC | CMD | CSF 1 | NMA 1 | SMA 1 | IMA 1 | CSF 2 | NMA 2 | SMA 2 | IMA 2 |
|---|---|---|---|---|---|---|---|---|---|---|

Further, when more than one connection specifies the same service rules, the common service rules need being specified in the message only once. In this case, the fields in the message can be arranged such that connections specifying the same service rules may be listed together with the associated service rules ("service rule oriented list"). TABLE 26 shows a connection-oriented list format for the message where the same service rules are used for the sleep mode in two connections.

TABLE 26

Delivery of Service Rules for Multiple Connections having a common Service Rule

| DST | SRC | CMD | CSF 1 | NMA 1 | SMA 1 | IMA 1 | CSF 2 | NMA 2 | SMA 1 | IMA 2 |
|---|---|---|---|---|---|---|---|---|---|---|

Alternatively, a service rule oriented list may be used, where the sleep mode service rules is specified only once next to classifiers CSF1 and CSF2, as shown in TABLE 27.

(SMA1) appears only once, the number of appearances of the connection specifiers (i.e., CSF 1 and CSF 2) grow from 2 to 6.

The number of bits required to express each connection or service rule should be examined. If a connection ID (CID), or another identifier, indicator, designator, or pointer can express the classifier associated with a connection using less bits, such a device should be used in the messages, rather than expressly providing the classifier. In some instances, service rule oriented list are more efficient. Similarly, if a service rule ID or any other identifier, indicator, designator, or pointer can express the service rule with less bits, such a device should be used in the messages, rather than directly stating service rule. The service rule can sometimes be described by a Boolean variable (e.g., "to alert" or "not to alert", "to discard" or "not to discard", and "to retain resource or not to retain resource") to enhance efficiency.

When the number of service rules is very small (e.g., two, in the case of a Boolean service rule), and when all the connections are known, a service rule oriented list may be used in which one service rule is specified implicitly. In this case, all the connections that are not expressly listed are assumed to be covered by the implicit service rule. Where the

TABLE 27

Delivery of Service Rules of Table 25, using a Service Rule Oriented List

| DST | SRC | CMD | NMA 1 | CSF 1 | NMA 2 | CSF 2 | SMA 1 | CSF 1 | CSF 2 | IMA 1 | CSF 1 | IMA 2 | CSF 2 |
|---|---|---|---|---|---|---|---|---|---|---|---|---|---|

Service rule oriented list may be more efficient than connection oriented list when the overhead costs associated with listing service rules are greater than the overhead costs associated with listing connections. The overhead costs of listing service rules grow when the number of bits required to express a service rule becomes large, and when the same service rules are repeated. TABLE 26 and TABLE 27 show that, in a service rule oriented list, even though the service rule number of connections is large, much savings in overhead may be realized. For example, if service rules SMA 1 and SMA 2 for the sleep mode are the only service rules that need to be described, and there are six (6) connections (CSF1 to 6), TABLE 29 shows a message using a service rule oriented list in which SMA 1 is the sleep mode service rule for CSF 1, CSF2, and CSFs 4 to 6, while SMA 2 is the service rule for CSF 3.

TABLE 29

Delivery of service rules (service rule oriented list)

| DST | SRC | CMD | SMA 1 | CSF 1 | CSF 2 | CSF 4 | CSF 5 | CSF 6 | SMA 2 | CSF 3 |
|-----|-----|-----|-------|-------|-------|-------|-------|-------|-------|-------|

Alternatively, one need only provide a service rule oriented list for service list SMA 2 of connection CSF 2, and allowing all the unlisted connections (i.e., CSF1, CSF2, and CSFs 4 to 6) to be implicitly associated service rule SMA 2, as shown in Table 30.

TABLE 30

Delivery of service rules (service rule oriented list with implicit association)

| DST | SRC | CMD | SMA 2 | CSF 3 |
|-----|-----|-----|-------|-------|

If there is a default Boolean service rule (e.g., service rule SMA1) which is not expressly listed in a message, the service rule field in a message of Table 30 may also be omitted, as it is clear that the specified connection uses service rule SMA 2.

TABLE 31

Delivery of service rules (service rule oriented list with implicit association)

| DST | SRC | CMD | CSF 3 |
|-----|-----|-----|-------|

In some instances, adopting a default service rule, allowing implicit association with a service list may also cause inefficiency. TABLE 32 illustrates a case when the default service rule is SMA2, so that connections using service rule SMA1 have to be included in the message:

TABLE 32

Delivery of service rules (service rules oriented list with implicit association)

| DST | SRC | CMD | CSF 1 | CSF 2 | CSF 4 | CSF 5 | CSF 6 |
|-----|-----|-----|-------|-------|-------|-------|-------|

Thus, a service rule field in a message may enable flexible listing, where one can choose the list with a lesser overhead to be used (e.g., the message of in TABLE 30). Also, when there are more than two service rule options, a service rule field may not be omitted, even when there is a default service rule, since the two or more connection lists cannot be distinguished without a service rule field.

Alternatively, a terminal and network edge point may opt to omit the list for a service rule when there is no connection using the service rule. In this case, a service rule oriented list is provided for each service rule associated with a connection. This approach allows a differential listing method to be used, as explained below.

Terminal and network edge point may opt to send a message only when there is a change in the service oriented or connection oriented list. The list that provides only the change is termed a "differential listing". If there is a service rule oriented list for SMA1, for example, then the connections in the list can be interpreted as changing the service rule to SMA1 from some other service rule or none associated. TABLE 33 illustrates the case when the connection of CSF3 is changing to service rule SMA1 from service rule SMA2, and the connection of CSF 1 is changed from a service rule SMA 1 to SMA 2.

TABLE 33

Delivery of service rules (differential lising)

| DST | SRC | CMD | SMA 1 | CSF 3 | SMA 2 | CSF 1 |
|-----|-----|-----|-------|-------|-------|-------|

In differential listing, a service rule that is not associated with a list is interpreted as representing a service rule that is not associated with a connection.

The initial state in differential listing may be first defined using a connection-oriented list, predetermined default values, a method of service rule oriented listing, or any other method that defines the initial service rule. Service rules may also be specified in conjunction with exchange of power mode transition messages, control messages, management messages, or data messages.

After a connection is set up, both the terminal and the network edge point may change the parameters of the connection, including any classification rule or action. In one embodiment, only the classification rule and the action for the normal mode are defined at the connection setup procedure, and the actions for the sleep and idle modes may be defined later by one or more connection change procedures.

To achieve a connection change, as provided in Table 4 above, the connection management messages include a connection change request message, a connection change response message, and a connection change ACK message. The formats for the connection change request, the connection change response, and the connection change ACK messages are similar to those discussed above for the connection setup request, the connection setup response, and the connection setup ACK messages. A connection ID may be included in each connection change request message.

To terminate a connection, a connection close request message is sent, and a connection close response message confirms the close request. Tables 34 and 35 provide exemplary formats for the connection close request and the connection close response messages, respectively.

TABLE 34

Connection close request message

| DST | SRC | CMD | Connection ID |
|-----|-----|-----|---------------|

TABLE 35

Connection close response message

| DST | SRC | CMD | Connection ID |
|-----|-----|-----|---------------|

A slaved connection termination can be achieved without exchange of any connection termination messages. A connection may be activated immediately after the connection set up or connection change procedure is carried out. However, a connection may be activated separately from the connection set up or connection change procedure. When a connection is set up but is not activated, the resource for the connection may be reserved or provisioned in the QoS mechanism, before the QoS mechanism operates communication in the connection. If activation is separated, additional messages such as connection activation request or connection activation response messages are exchanged.

A connection may be deactivated without closing the connection. When a connection is deactivated but not closed, the resource for the connection may still be reserved or provisioned in the QoS mechanism, even though the QoS mechanism is not operating on the connection. If deactivation is separated from connection closing, additional messages such as connection deactivation request or connection deactivation response messages are exchanged.

In one embodiment, when a terminal enters normal mode, all connections associated with the service for the normal mode are activated. Similarly, when a terminal transitions into a sleep mode, all connections associated with services in the sleep mode are reactivated (deactivated and activated). In that embodiment, per connection activation or deactivation messages are not used; only the power mode transition messages, such as sleep mode request and sleep mode response messages are exchanged to trigger the activation.

A connection may be set up by an internal or external provisioning server, which executes a service rule or an alerting rule as a domain administrator, a service provider, or a network edge point administrator. FIG. 6 shows a provisioning process, in accordance with one embodiment of the present invention. As shown in FIG. 6, at step 602, a provision manager of the network edge point (e.g., provision manager 405) may communicate with a provisioning server (e.g., provisional server 601) to receive the service or alerting rules. The provisioning server then cooperates with the connection manager and the power mode manager of a terminal (steps 603 and 604) to set up one or more connections accordingly. As shown in FIG. 6, for provisioning, a provision request message, a provision response message, and a provision ACK message may be exchanged between a provisional server 601 and a provisioning manager 405 of a network edge point. The formats of these messages may be similar to those of connection setup request, connection setup response, and connection setup ACK messages already described above.

When a mobile terminal changes its point of network attachment from one network edge point another, some connections are preferably kept alive. A handoff manager of a terminal (e.g., handoff manager 503) typically manages the handoff-related operations. A handoff manager of a network edge point (e.g., handoff manager 406) communicates with the handoff manager of an associated terminal to assist or lead the handoff processes, including the transfer of connections, where necessary, so as to avoid service disruption and over-the-air signaling during handoff. In a transfer of connections, a connection transfer request message, a connection transfer response message, and a connection transfer ACK message are exchanged, as provided in Table 4 above. The formats of the connection transfer request, the connection transfer response, and the connection transfer ACK messages can be similar to those of the connection setup request, the connection setup response, and the connection setup ACK messages. The handoff messages may include information regarding the connections to be transferred, such as the relevant parts of a service table.

The term 'service' refers to any operation performed on a classified packet. Delivering and discarding a packet are examples of services. Delivering a particular level of QoS for packets in a connection is another example of a service. A service manager in a network edge point (e.g., service manager 404) may direct classified packets into a QoS mechanism or a dropper, according to the service table, based on the packet classification and the receiver's power mode. In some embodiments, the service manager communicates with a connection manager to access a service table whenever it processes a packet. Alternatively, the service manager may maintain its own service table, as shown in the example in Table 11, and may communicate with a communication manager whenever an update to the table is required. As another alternative, a service manager may maintain a service rule table such as that shown in Table 36, and may communicate with communication manager when there is any change in the table. In Table 36, unlike Table 11 above, packets are provided to the service manager with a connection ID that enables the service manager to match the packet to a service without executing a classification step.

TABLE 36

Service rule table

| Connection ID | Receiver ID | Power status | Action |
|---|---|---|---|
| 1 | 1 | Normal | QoS spec 1 |
|  |  | Sleep | QoS spec 2 |
|  |  | Idle | Discard |
| 2 | 1 | Normal | Qos spec 3 |
|  |  | Sleep | Discard |
|  |  | Idle | Discard |
| . | . | . | . |
| . | . | . | . |
| . | . | . | . |
| I | 2 | Normal | Qos spec j |
|  |  | Sleep | Qos spec j + 1 |
|  |  | Idle | Discard |
| i + 1 | 1 | Normal | QoS spec 1 |
|  |  | Sleep | Discard |
|  |  | Idle | Discard |
|  | 2 | Normal | QoS spec 1 |
|  |  | Sleep | QoS spec 2 |
|  |  | Idle | Discard |
| . | . | . | . |
| . | . | . | . |
| . | . | . | . |
|  | N | Normal | Discard |
|  |  | Sleep | Discard |
|  |  | Idle | Discard |
| . | . | . | . |
| . | . | . | . |
| . | . | . | . |
| M | N | Normal | QoS spec 1 |
|  |  | Sleep | QoS spec 2 |
|  |  | Idle | QoS spec 4 |

A service manager (e.g., service manager 404) may also communicate with a power mode manager (e.g., power mode manager 403) to access a terminal power status table (e.g., the terminal power status table shown in Table 10). Alternatively, a service manager may maintain its own terminal power mode table. QoS may be defined by a QoS specification, which specifies such parameters as traffic, service type, service class, service priority, and per hop behavior. For example, a QoS specification may include a maximum sustained traffic rate, a maximum traffic burst rate, a minimum reserved traffic rate, a minimum tolerable traffic rate, a scheduling type, a bandwidth request or transmission policy, a tolerated jitter, or a maximum latency. As another example, a QoS specification may include an access policy, a user priority, an ACK policy, a schedule, a nominal packet size, a maximum packet size, a minimum service interval, a maximum service interval, an inactivity interval, a suspension interval, a service start time, a minimum data rate, a mean data rate, a peak data rate, a maximum burst size, a delay bound, a minimum physical rate, a surplus bandwidth allowance, or a medium time.

QoS mechanism may include a scheduler, a poller, a policer, a shaper, a buffer, a bandwidth allocation unit, a resource reservation unit, or another suitable means for delivering a particular QoS to the packet. When a packet is received, a QoS mechanism first finds the QoS specification associated with the packet, and may access a service table or service rule table, which may be maintained by the QoS mechanism. Alternatively, a service table may be accessed through a connection manager or a service manager. A packet may be received with a connection ID (CID). A QoS mechanism may also communicate with a power mode manager to access a terminal power mode table, such as that shown in Table 10. Alternatively, a QoS mechanism may maintain its own terminal power mode table. A QoS mechanism may configure or provision itself to operate according to a QoS specification.

A broadcast or multicast packet may have multiple receiving terminals in different power modes, with different service rules. Therefore, the present invention allows multicast or broadcast packets to be delivered to each terminal, or be discarded, according to packet classification and each terminal's power modes. Further, the present invention allows a receiver in a power-saving mode to be alerted according to packet classification and the power-saving modes of the multiple receivers.

In one embodiment, a terminal maintains a service table which defines a classification rule, a service rule, and an alerting rule for all its connections, including broadcast or multicast packets. This service table (e.g., the service table shown in Table 13) may be managed by the terminal's connection manager (e.g., connection manager 501). A network edge point receives the service tables of all terminals it communicates with through connection set up or connection change procedures, and may integrate all these service tables into its own service table (e.g., service table shown in Table 11). An example of a service rule involving a broadcast connection is provided in the entry corresponding to connection ID 'i+1' classification rule Table 12, service rule Table 36, and alerting rule Table 9.

According to one embodiment of the present invention, a broadcast or multicast packet is delivered with a QoS at least at the level specified for that service in the service table. As a result, a broadcast or multicast packet is discarded only when all receivers requires discarding the packet. Each receiving terminal of a broadcast or multicast packet is alerted, if alerting is specified for that terminal. As shown in the example of Table 12, the packets for the broadcast connection with connection ID 'i+1' are sent to all terminals 1 to N. A list of all receivers of a multicast connection may be maintained by a connection manager (e.g., connection manager 402).

To illustrate, consider terminals 1, 2, and N as having normal, sleep, and idle power modes, respectively. Table 36 shows, for the respective power modes of the receiving terminals 1, 2 and N, the services to be rendered are QoS spec 1, QoS spec 2, and 'discard'. If QoS spec 1 is a higher level of service than QoS spec 2, a broadcast packet is delivered only once to terminal 1 with QoS spec 1. For terminal 2, however, the packet may be delivered twice: once with QoS spec 1 unsuccessfully, as terminal 2 is in a sleep mode when the delivery is first attempted. Delivery will be successful under QoS 2, which specifies alerting terminal 2 in the alerting rule table (Table 9).

Consider next that the power modes of terminals 1, 2, and N are in idle, idle, and sleep power modes, respectively. As shown in Table 36, the services corresponding to the respective power modes of these receiving terminals are all 'discard'. Further, as none of the terminals specify an alert, none of these terminals are alerted.

FIG. 7 shows a handoff procedure by which a terminal detaches from one network edge point and attaches to another. As a part of a connection transfer, the service table of the network edge point 1 that is relevant to the terminal is transferred to the network edge point 2 for integration into the service table of the network edge point 2. FIG. 7 shows that the connection to be transferred may be one that is established between provisioning server 601, network edge point 1 and terminal 500 through provisioning procedure 602 and connection set up procedure 603 discussed above in conjunction with FIG. 6. At some point in time, terminal 500 initiates handoff procedure 701 with network edge point 1 or network point 2, or both. Connection transfer is effectuated between network edge points 1 and 2. A connection transfer according to the present invention avoids disruption in the ongoing connections during handoff, and also helps avoid the over-the-air signaling that may be required for closing connection with the network edge point 1 and for setting up connection with the network edge point 2.

The detailed description above is provided to illustrate the specific embodiments of the present invention and is not intended to be limiting. Numerous variations and modifications within the scope of the present invention are possible. The present invention is set forth in the accompanying claims.

We claim:

1. A network edge point in a communication network associated with a terminal and receiving packets from the network that specify the terminal as destination, comprising:
   a connection manager determining a classification rule for the packets;
   a classifier that assigns to each packet a classification according to the classification rule; and
   a service manager that maps a service to the packet according to the packet's classification and a current power mode associated with the terminal, wherein the service manager accesses a rule table to determine whether the terminal should be alerted from a power saving state to process the packet.

2. A network edge point as in claim 1, wherein the classifier assigns a connection identification to the packet.

3. A network edge point as in claim 1, wherein the service mapping is determined based on a functionality of the packet and the current power mode.

4. A network edge point as in claim 3, wherein the rule table is accessed using the packet's classification and the current power mode associated with the terminal.

5. A network edge point as in claim 4, wherein the terminal provides the rule table to the network edge point.

6. A network edge point as in claim 1, wherein the terminal provides the current power mode to the network edge point when the terminal undertakes a power mode transition.

7. A network edge point as in claim 1, wherein the connection manager manages the connection between the network edge point and the terminal.

8. A network edge point as in claim 1, further comprising a hand-off manager, which transfers the connection from the network edge point to a second network edge point.

9. A network edge point as in claim 8, wherein a portion of the service mapping associated with the terminal is transferred to the second network edge point at the transfer of the connection to the second network edge point.

10. A network edge point as in claim 1 wherein, when the packet specifies multiple recipients, each recipient receives at least the least of the services specified for the multiple recipients.

11. A network edge point as in claim 1, wherein the mapped service comprises alerting the terminal.

12. A network edge point as in claim 1, wherein the mapped service comprises not alerting the terminal.

13. A network edge point in a communication network associated with a terminal and receiving packets from the network that specify the terminal as destination, comprising:
a connection manager determining a classification rule for the packets;
a classifier that assigns to each packet a classification according to the classification rule; and
a service manager that maps a service to the packet according to the packet's classification and a current power mode associated with the terminal, wherein the service manager accesses a current power mode table to determine the current power mode of the terminal.

14. A method for providing service in a network edge point in a computer communication network having a connection with a terminal, the method comprising:
classifying packets received from the communication network that specify the terminal as destination and assigning to each packet a classification;
determining a service for the packet according to packet's classification and a current power mode associated with the terminal;
accessing a rule table to determine whether or not the terminal should be alerted from the current power mode to process the packet; and accordingly providing the service.

15. A method as in claim 14, wherein classifying packets comprises assigning a connection identification to each packet.

16. A method as in claim 14, wherein the service is determined based on a functionality of the packet and the current power mode.

17. A method as in claim 16, wherein the rule table is accessed using the packet's classification and the current power mode associated with the terminal.

18. A method as in claim 17, wherein the terminal provides the rule table to the network edge point.

19. A method as in claim 14, further comprising notifying the network edge point the terminal's current power mode, when the terminal undertakes a power mode transition.

20. A method as in claim 14, further comprising managing the connection with the terminal in a connection table.

21. A method as in claim 14, further comprising following a hand-off procedure when the terminal transfers the connection from the network edge point to a second network edge point.

22. A method as in claim 21, wherein a portion of a service table associated with the terminal is transferred to the second network edge point at the transfer of the connection to the second network edge point.

23. A method as in claim 14 wherein, when the packet specifies multiple recipients, each recipient receives at least the least of the services specified for the multiple recipients.

24. A method as in claim 14; wherein the determined service comprises alerting the terminal.

25. A method as in claim 14, wherein the determined service comprises not alerting the terminal.

26. A method as in claim 14 wherein, when the packet specifies multiple recipients, each recipient receives at least the least of the services specified for the multiple recipients.

27. A method for providing service in a network edge point in a computer communication network having a connection with a terminal, the method comprising:
classifying packets received from the communication network that specify the terminal as destination and assigning to each packet a classification;
determining a service for the packet according to packet's classification and a current power mode associated with the terminal, wherein a current power mode table is accessed to determine the current power mode of the terminal;
and providing the service.

28. A network edge point in a communication network associated with a terminal and receiving packets from the network that specify the terminal as destination, comprising:
a connection manager determining a classification rule for the packets;
a classifier that assigns to each packet a classification according to the classification rule; and
a service manager that maps a service to the packet according to the packet's classification and a current power mode associated with the terminal, wherein the service is mapped according to a service table comprising quality of service (QoS) specifications.

29. A network edge point in a communication network associated with a terminal and receiving packets from the network that specify the terminal as destination, comprising:
a connection manager determining a classification rule for the packets;
a classifier that assigns to each packet a classification according to the classification rule; and
a service manager that maps a service to the packet according to the packet's classification and a current power mode associated with the terminal, wherein the terminal provides the network edge point mapping between the service and the packet as a function of packet classification and the terminal's power mode.

30. A network edge point in a communication network associated with a terminal and receiving packets from the network that specify the terminal as destination, comprising:
a connection manager determining a classification rule for the packets;
a classifier that assigns to each packet a classification according to the classification rule; and
a service manager that maps a service to the packet according to the packet's classification and a current power mode associated with the terminal, wherein the mapped service comprises discarding the packet, and, wherein a criterion for determining whether or not to discard the packet is based on packet classification and the terminal's power mode.

31. A network edge point as in claim 30, wherein the terminal provides the criterion to the network edge point.

32. A network edge point in a communication network associated with a terminal and receiving packets from the network that specify the terminal as destination, comprising:
a connection manager determining a classification rule for the packets;
a classifier that assigns to each packet a classification according to the classification rule; and
a service manager that maps a service to the packet according to the packet's classification and a current power mode associated with the terminal, wherein the service manager further determines whether or not a service resource is maintained for the packet according to a criterion that depends on the packet's classification and the current power mode associated with the terminal.

33. A network edge point as in claim 32, wherein the terminal provides the criterion to the network edge point.

34. A method for providing service in a network edge point in a computer communication network having a connection with a terminal, the method comprising:
classifying packets received from the communication network that specify the terminal as destination and assigning to each packet a classification;
determining a service for the packet according to packet's classification and a current power mode associated with the terminal, wherein a service table provided by the terminal to the network edge point provides quality of service (QoS) specifications;
and providing the service.

35. A method as in claim 34, wherein the service is determined based on a functionality of the packet and the current power mode.

36. A method for providing service in a network edge point in a computer communication network having a connection with a terminal, the method comprising:
classifying packets received from the communication network that specify the terminal as destination and assigning to each packet a classification;
determining a service for the packet according to packet's classification and a current power mode associated with the terminal, wherein the service comprises discarding the packet and wherein a criterion for determining whether or not to discard the packet is based on packet classification and the terminal's power mode; and
providing the service.

37. A method as in 36, wherein the terminal provides the criterion to the network edge point.

38. A method for providing service in a network edge point in a computer communication network having a connection with a terminal, the method comprising:
classifying packets received from the communication network that specify the terminal as destination and assigning to each packet a classification;
determining a service for the packet according to packet's classification and a current power mode associated with the terminal, further comprising determining whether or not a service resource is maintained for the packet according to a criterion that depends on the packet's classification and the current power mode associated with the terminal.

39. A method as in claim 38, wherein the terminal provides the criterion to the network edge point.

40. A terminal associated with a network edge point in a communication network, comprising:
a power mode manager for determining a power mode of the terminal and communicating the power mode to the network edge point; and
a connection manager for communicating with the network edge point a classification rule for packets designating the terminal as destination and a service rule, wherein the service rule maps a service to each packet according to the packet's classification and the power mode of the terminal, wherein the connection manager provides a rule table to a service manager at the network edge point for determining whether or not the terminal is to be alerted from a power saving state, according to the packet's classification and the current power mode associated with the terminal.

41. A terminal as in claim 40, wherein the mapped service comprises alerting the terminal.

42. A terminal as in claim 40, wherein the mapped service comprises not alerting the terminal.

43. A terminal as in claim 40, wherein the terminal provides the current power mode to the network edge point when the terminal undertakes a power mode transition.

44. A terminal as in claim 40, wherein the connection manager manages the connection between the network edge point and the terminal.

45. A terminal as in claim 40, further comprising a hand-off manager, which manages the transfer of the terminal's association from the network edge point to a second network edge point.

46. A terminal as in claim 45, wherein a portion of the service mapping associated with the terminal is transferred to the second network edge point at the transfer of the connection to the second network edge point.

47. A terminal as in claim 40, wherein whether or not the terminal is to be alerted is determined based on a functionality of the packet and the current power mode.

48. A terminal associated with a network edge point in a communication network, comprising:
a power mode manager for determining a power mode of the terminal and communicating the power mode to the network edge point; and
a connection manager for communicating with the network edge point a classification rule for packets designating the terminal as destination and a service rule, wherein the service rule maps a service to each packet according to the packet's classification and the power mode of the terminal, wherein the mapped service comprises discarding the packet, and wherein a criterion for determining whether or not to discard the packet is based on packet classification and the terminal's power mode.

49. A terminal as in claim 48, wherein the criterion is based on a functionality of the packet and the current power mode.

50. A terminal as in claim 48, wherein the terminal provides the criterion to the network edge point.

51. A terminal associated with a network edge point in a communication network, comprising:
a power mode manager for determining a power mode of the terminal and communicating the power mode to the network edge point; and
a connection manager for communicating with the network edge point a classification rule for packets designating the terminal as destination and a service rule, wherein the service rule maps a service to each packet according to the packet's classification and the power mode of the terminal, wherein the connection manager provides to a service manager of the network edge point a criterion that depends on the packet's classification and the current power mode associated with the terminal, the criterion enabling the service manager to determine whether or not a service resource is maintained for the packet.

52. A terminal associated with a network edge point in a communication network, comprising:
a power mode manager for determining a power mode of the terminal and communicating the power mode to the network edge point; and
a connection manager for communicating with the network edge point a classification rule for packets designating the terminal as destination and a service rule, wherein the service rule maps a service to each packet according to the packet's classification and the power mode of the terminal, wherein the connection manager further communicates to the network edge point a resource retention rule that determines whether or not a service resource for a packet is maintained, according to the packet's classification and the power mode of the terminal.

53. A terminal as in claim 52, wherein the service resource is maintained during the power mode of the terminal and the service rule specifies that the terminal is to be alerted.

54. A method for enabling service for a terminal associated with a network edge point in a communication network, the method comprising:

determining a power mode of the terminal; and communicating to the network edge point: (a) the power mode; (b) a classification rule for packets designating the terminal as destination; and (c) a service rule, wherein the service rule maps a service to each packet according to the packet's classification and the power mode of the terminal, and wherein a rule table is accessed to determine whether or not the terminal is to be alerted from a power saving state, according to the packet's classification and the current power mode associated with the terminal.

55. A method as in claim 54, wherein the mapped service comprises alerting the terminal.

56. A method as in claim 54, wherein the mapped service comprises not alerting the terminal.

57. A method as in claim 54, wherein the terminal provides the current power mode to the network edge point when the terminal undertakes a power mode transition.

58. A method as in claim 54, further comprising managing the association between the network edge point and the terminal.

59. A method as in claim 54, further comprising managing the transfer of the terminal's association from the network edge point to a second network edge point.

60. A method as in claim 59, wherein a portion of the service mapping associated with the terminal is transferred to the second network edge point at the transfer of the connection to the second network edge point.

61. A method as in claim 54, wherein whether or not the terminal is to be alerted is determined based on a functionality of the packet and the current power mode.

62. A method for enabling service for a terminal associated with a network edge point in a communication network, the method comprising;

determining a power mode of the terminal; and communicating to the network edge point: (a) the power mode; (b) a classification rule for packets designating the terminal as destination; and (c) a service rule, wherein the service rule maps a service to each packet according to the packet's classification and the power mode of the terminal, wherein the mapped service comprises discarding the packet, and wherein a criterion for determining whether or not to discard the packet is based on packet classification and the terminal's power mode.

63. A method as in claim 62, wherein the criterion is based on a functionality of the packet and the current power mode.

64. A method as in claim 62, wherein the terminal provides the criterion to the network edge point.

65. A method for enabling service for a terminal associated with a network edge point in a communication network, the method comprising:

determining a power mode of the terminal; and communicating to the network edge point: (a) the power mode; (b) a classification rule for packets designating the terminal as destination; and (c) a service rule, wherein the service rule maps a service to each packet according to the packet's classification and the power mode of the terminal and wherein a service manager of the network edge point is provided a criterion that depends on the packet's classification and the current power mode associated with the terminal, the criterion enabling the service manager to determine whether or not a service resource is maintained for the packet.

66. A method for enabling service for a terminal associated with a network edge point in a communication network, the method comprising:

determining a power mode of the terminal; and communicating to the network edge point: (a) the power mode; (b) a classification rule for packets designating the terminal as destination; and (c) a service rule, wherein the service rule maps a service to each packet according to the packet's classification and the power mode of the terminal and wherein the network edge point is provided a resource retention rule that determines whether or not a service resource for a packet is maintained, according to the packet's classification and the power mode of the terminal.

67. A method as in claim 66, wherein the service resource is maintained during the power mode of the terminal and the service rule specifies that the terminal is to be alerted.

* * * * *